United States Patent [19]

Fisk et al.

[11] 3,892,925

[45] July 1, 1975

[54] ELECTRIC SIGNAL EXCHANGE SWITCHING ARRANGEMENT

[75] Inventors: Dale Edward Fisk, San Jose; Merle Edward Homan, Los Gatos; Charles Laurie Meiley; Zack Dwayne Reynolds, both of San Jose; Robert Vernon Watkins, Los Gatos; Fritz S. Wiedmer, Saratoga, all of Calif.

[73] Assignee: International Business Machines Corporation, Armonk, N.Y.

[22] Filed: June 3, 1974

[21] Appl. No.: 475,682

[52] U.S. Cl. ...... 179/15 AT; 179/15 A; 179/18 GF; 179/15 BV; 179/15 BW

[51] Int. Cl. ........ H04 3/02

[58] Field of Search .......... 340/172.5, 166 R; 179/15 AT, 15 AQ, 15 A, 15 BW, 15 BV, 18 GF

[56] References Cited

UNITED STATES PATENTS

| | | | |
|---|---|---|---|
| 3,708,786 | 1/1973 | Hardin | 340/172.5 |
| 3,794,768 | 2/1974 | Carney | 179/15 BV |
| 3,814,860 | 6/1974 | Pringle | 179/15 BW |

*Primary Examiner*—Ralph D. Blakeslee
*Attorney, Agent, or Firm*—George E. Roush

[57] ABSTRACT

A multiple of telephone or like communications signal transmission lines are interconnected in time division multiplex (TDM) mode by integrated semiconductor switching circuitry. Preferably, electronic solid state structure most suitable for embodying field effect transistors (FET) and like associated devices is arranged in modular chip components permitting extension to large numbers of transmission lines, as desired. Input or calling transmission line terminals are connected to node busses by FET switches in predetermined time sequence under control of a central processing unit. Preferably, a separate timing pulse train generating circuit is used for the switching operation. Output or called transmission line terminals are connected to the node busses in predetermined time sequence at which every calling line is sampled at least once each switching cycle. Signal bandwidth is adjustable by arranging the switching circuitry to sample a calling line one, two, or more times in each switching cycle. Conventional semiconductor structure inherently forms capacitors of substantial reactance between the node busses and points of reference potential. Circuitry is incorporated in the arrangement for discharging the capacitors prior to connecting the input signal lines to the node busses. The circuitry also incorporates FET switch elements arranged for isolating uncalled output terminals from the switching circuitry, and for short circuiting each pair of idle output terminals.

15 Claims, 5 Drawing Figures

ELECTRIC SIGNAL EXCHANGE SWITCHING ARRANGEMENT

The invention stems from the same endeavors that produced the invention disclosed in the copending U.S. Pat. Application, Ser. No. 475,683 of Dale Edward Fisk and Merle Edward Homan, filed on the same day as the instant application for "Time-Division Pulse-Multiplex Digital Electric Signal Switching Circuit Arrangement."

The invention relates to switching circuitry for interconnecting calling and called telephone or like communications transmission lines in time division multiplex (TDM) mode and it particularly pertains to such circuitry embodied in integrated semiconductor devices, although it is not limited to such devices.

The prior art is replete with communications circuit switching arrangements. Nearly a century of progress in the art has brought solid state electronic switching circuitry to the forefront in the last two decades. Prior art circuit arrangements having features in common with the type to which the invention is directed are to be found in the following U.S. Pat. Nos.: 3,598,914 8/1971 Synnott 178-58 3,639,693 2/1972 Bartlett et al. 179-15 AT 3,649,759 3/1972 Buzzard et al. 179-2 DP 3,692,942 9/1972 Inose et al. 179-15 BS 3,700,820 10/1972 Blasbalg 179-15 A.

These patented state-of-the-art circuit arrangements address the problems circumjacent to data processor controlled common signal channel systems having electronic circuit switching arrangements or the equivalent. Time division multiplexing into a single communications channel in voice or data mode is available. Those skilled in the art will adapt two-way systems from those that teach one-way transmission. The arrangement disclosed by Synnott is directed to the maintenance of a constant data rate by the addition of idle and/or special synchronizing characters when no data words are to be or are effectively transmitted. Bartlett et al. are concerned with synchronizing bit distributors between a plurality of input and a plurality of output channels. Digital filter arrangements are specifically disclosed in the patent to Buzzard et al while Inose et al disclose a specific algorithm for optimizing the multiplex of a number of high and low speed channels sequentially into a single channel. Interleaving low and high speed data channels into a single sequential channel under processor control with predetermined priority is specifically taught by Blasbalg et al. These prior art teachings do not suggest switching circuit arrangements for time division multiplexing calling signals onto a number of node busses at a predetermined rate and sampling for these applied signals at a rate corresponding to said predetermined rate whereby each applied signal is sampled and the node busses are freed after each sampling as will be developed in more detail hereinafter.

Preferably, the circuitry according to the invention is arranged for multiplexing at one of a number of predetermined rates and a corresponding number of samples taken whereby the signal bandwidth capability is varied to accommodate the communications service at hand, which is not taught by this prior art.

Accordingly, the objects of the invention indirectly referred to hereinbefore and those that will appear hereinafter are attained in circuitry particularly well embodied in conventional modular solid state electronic chip structure. Incoming or calling communications transmission lines terminate at a multiple of input terminals of the signal switching circuit arrangement, while a multiple of output terminals of the signal switching circuit arrangement are the termination point for outgoing or called communications transmission lines. The input connections are made to a number of signal node busses in predetermined allocation. Timing pulses trains are applied to the control electrodes of a number of electron flow path devices for applying the signals from the calling communications transmission lines and for sampling the signals supplied to the node busses for applying the sampled signals to the called communication transmission lines. The electron flow path devices each have two circuit path electrodes for gating the signals and a control electrode for opening and closing the electronic gates. Preferably, field effect transistors (FET) are used both for the improved switching characteristics which they provide and for the adaptability to integrated semiconductor device manufacture. Electron flow path devices are operated in conjunction with a timing pulse train generating circuit which is preferably provided locally for the purpose, although if desired, timing pulses may be obtained from associated devices and/or circuit arrangements, such as a central data processing unit, for example. The timing pulse generating circuit is connected to control circuitry having output terminals coupled to the control electrodes of the electron flow path devices for controlling the opening and closing of the electronic gate in predetermined timed sequence for applying input signals individually to the node busses and for connecting the output terminals simultaneously to the node busses in time-division multiplex (TDM) sampling fashion whereby signals from a calling subscriber are switched through to the called line only. The sequence of switching may be predetermined by setting switches, "hard wired" controls or, preferably, by a program controlled data processing unit of conventional form.

In modern semiconductor structure, the node busses exhibit substantial capacitive reactance with respect to a reference potential node element inherent in the structure and the resulting capacitors must be discharged periodically in some arrangements. According to the invention, further electron flow path devices are connected individually to the node busses and in common to the reference potential node element for discharging these node bus capacitors in response to pulses derived from the control circuitry. The latter pulses are supplied at predetermined times, preferably just prior to the application of an incoming signal to the individual node busses.

For a given rate of switching, there is a corresponding signal frequency bandwidth provided. The bandwidth is increased, according to the invention, by increasing the rate of switching, with of course a reduction in the number of individual signals that may be accommodated by a given system at any one time. Thus, a variable bandwidth feature allows allocation of total system bandwidth to the various users son a demand basis.

The output terminals are preferably two-wire balanced terminals for more readily working into conventional two-to-four wire converter circuitry. According to the invention, the out-put terminals preferably are isolated from the individual node busses by additional electron flow path devices and signal holding circuits connected between the individual node busses and one of the balanced terminals and between the other balanced terminal and the reference potential node bus. The latter electron flow path devices are opened and closed at the given rate of switching in accordance with the called or non-called status of the associated output transmission lines causing the existing signal on an individual node bus to be transferred into the signal holding circuit. Further, according to the invention, still additional electron flow path devices are individually connected from the node bus between the electron flow path devices and the signal holding circuit and the reference potential node for short circuiting the individual signal paths when the output transmission line is idle. These additional electron flow path devices, or shielding switches, may also be either "hard wired" or program controlled, as are the other electron flow path device switches.

In order that all of the advantages stemming from the invention be obtained in practice, the preferred embodiment thereof, given by example only, is described in detail hereinafter with reference to the accompanying drawing, forming a part of the specification, and in which.

Figure 1:
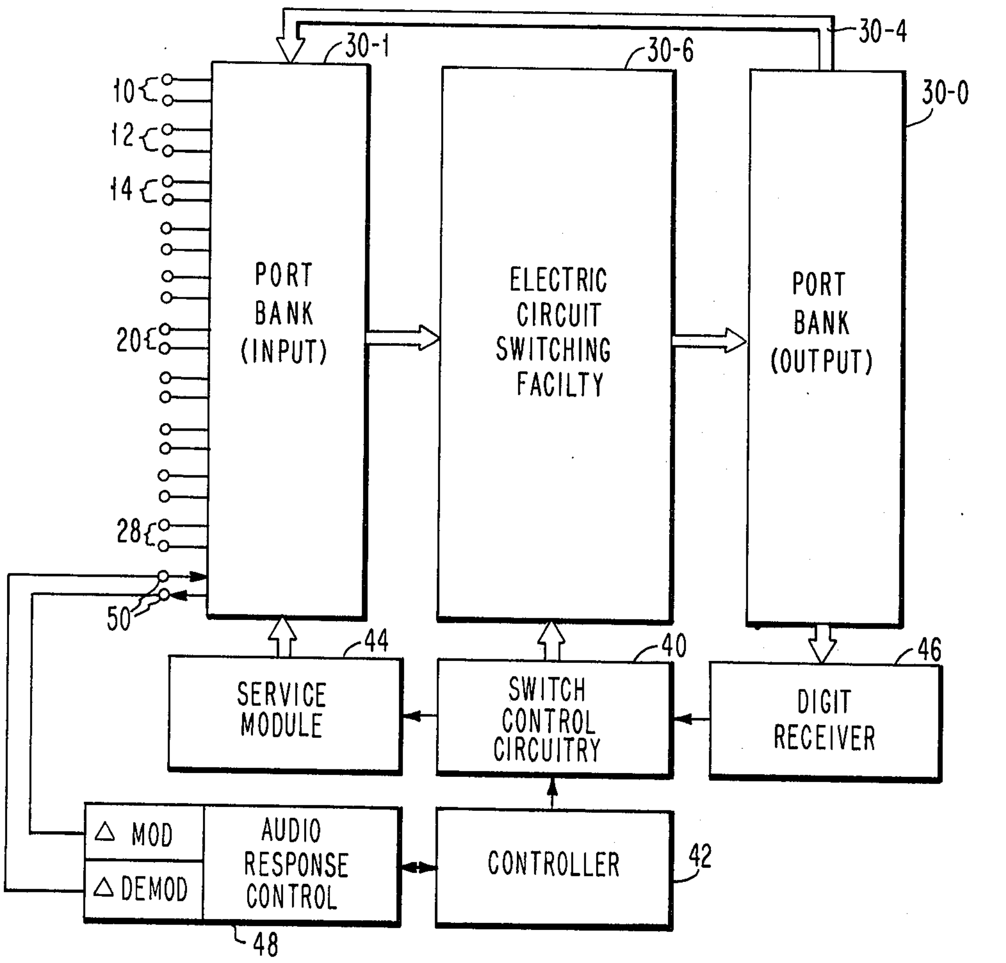
FIG. 1 is a functional diagram of a communications terminal exchange incorporating a multiplex electric signal switching circuit arrangement according to the invention.

A functional arrangement for an exemplary embodiment of the invention is diagrammed in FIG. 1. A multiple of pairs of transmission line terminals of which only a few (10, 12, 14 . . . 28) are shown here, are arranged for terminating communications transmission lines to be interconnected by the electric signal switching circuit arrangement according to the invention. In this diagram, the matrix is shown as being divided into three parts in the interest of clarity. Transmission line terminals 10-28 are shown leading to a port (input) bank 30-1. A port (output) bank 30-0 is shown spaced apart from the first bank, but connected thereto by a parallel circuit branch 30-4. Electric circuit connections between the two banks are made by an electric circuit switching facility 30-6. Actually, as will be seen hereinafter, each pair of terminals, for example, terminals 10, are at one and the same time both input and output terminals for two-way signal transmission, as for example, in a conventional voice telephone system. The electric circuit switching facility 30-6 is controlled by switch control circuitry 40 under the control of a central data processing unit or controller 42. The control circuitry 40 also exercises control over a service module 44 which supplies "ringing" tone, "dial" tone, "busy" tone, and the like. A digital receiver 46 translates control digit information into control signals for application to the switch control circuitry 40. In addition to voice communication telephone lines, other signal handling apparatus may be accommodated, for example, an audio response system having an audio response control circuit 48 as shown coupled to corresponding circuit terminals 50.

Figure 2:
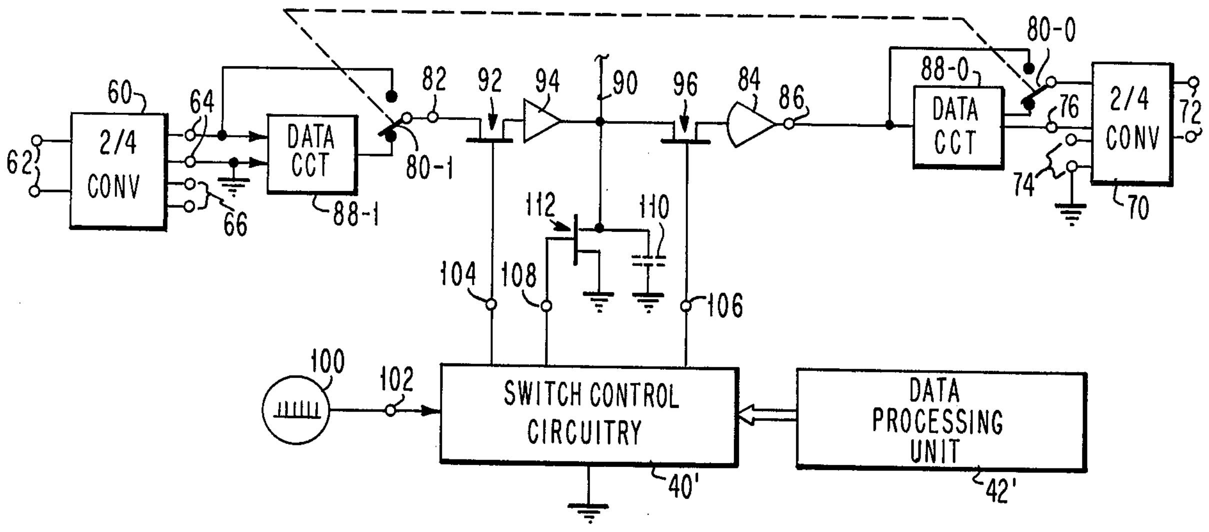
FIG. 2 is a schematic diagram of essential circuitry according to the invention.

Typical connections of communications systems in accordance with the invention are shown in FIG. 2. A conventional two-to-four wire converter circuit 60 is connected to a pair of transmission line terminals 62 for two-way communication. Communication in one direction only is effected by circuitry coupled to a pair of unbalanced terminals 64 and communications in the other direction is effected by circuitry coupled to a pair of balanced terminals 66. Similarly, another converter circuit 70 is for a two-way communication and similarly has a pair of unbalanced terminals 74 and a pair of balanced terminals 76. Communication in the one direction is through the circuit wiring as shown and communication in the other direction is established by means of another similar circuit through the electric circuit switching facility interconnecting the terminals 74 and the terminals 66. For voice frequency signal transmission, a switch arrangement having two switches 80-0 and 80-1, is thrown to the upper position for connecting one of the input terminals 64 to an input terminal 82 of the electric circuit switching facility and for connecting the terminals 76 to the output terminals 86 of the electric circuit switching facility, which in turn is connected to the output of the sample-and-hold circuit 84. The terminals 82 and 86 each represent one of a multiple of such input and output terminals of the electric circuit switching facility. For data transmission, the switch arrangement 80 is thrown to the lower position as shown for interposing data handling circuits 88-1 and 88-0 in the overall circuitry external to the electric circuit switching facility. These data handling circuits are optional and form a separate invention.

The latter circuitry is more completely described and illustrated in the above mentioned copending U.S. Pat. application, Ser. No. 475,683. Amplitude modulated signals appearing at input terminals 82 are applied to a node bus 90, which is but one of a number of such node buses in the electric circuit switching facility, by means of a controlled electron flow path device, shown here as a field effect transistor (FET) 92. An amplifying circuit 94 is interposed as the design at hand requires. Signal voltage on the node bus 90 is transferred by means of another FET 96 and a sample-and-hold circuit 84 to the output terminal 86. The signal gates comprising the FET 92 and 96 are opened and closed in response to square-wave voltages obtained from switch control circuitry 40' to which a train of timing pulses obtained from a timing pulse train generating circuit 100 is applied at terminals 102. The switching control circuit 40' is alternately a "hard wired" circuit, a manually settable circuit, or preferably circuitry controlled by a programmed data processing unit 42', which alternately also supplies the timing pulse train at terminals 102. Output/square-wave voltages are delivered by switch control circuitry 40' at terminals 104, 106, and 108. The first two terminals are connected to the FET 92 and 96 respectively. In the electric circuit switching facility according to the invention, the node bus 90 will exhibit a large capacitive reactance between the node bus itself and a node of fixed reference potential for the overall circuitry. This capacitive reactance is represented by a capacitor 110, shown in broken lines. In some embodiments of the invention, it is considered desirable to discharge the capacitor 110 periodically rather than depend on adjustment of the voltage across the capacitor through the associated components of the circuitry. Another FET 112 is therefore connected between the node bus 90 and the point of reference potential, shown here as ground, and pulsed at appropriate times from a square wave appearing at the terminal 108 of the switch control circuitry 40'. While the essentials of the circuitry according to the invention are given in this example of a switching setup for a single one-way communications link, additional detail useful in the practice of the invention will be found in the diagram of FIG. 3.

Figure 3:
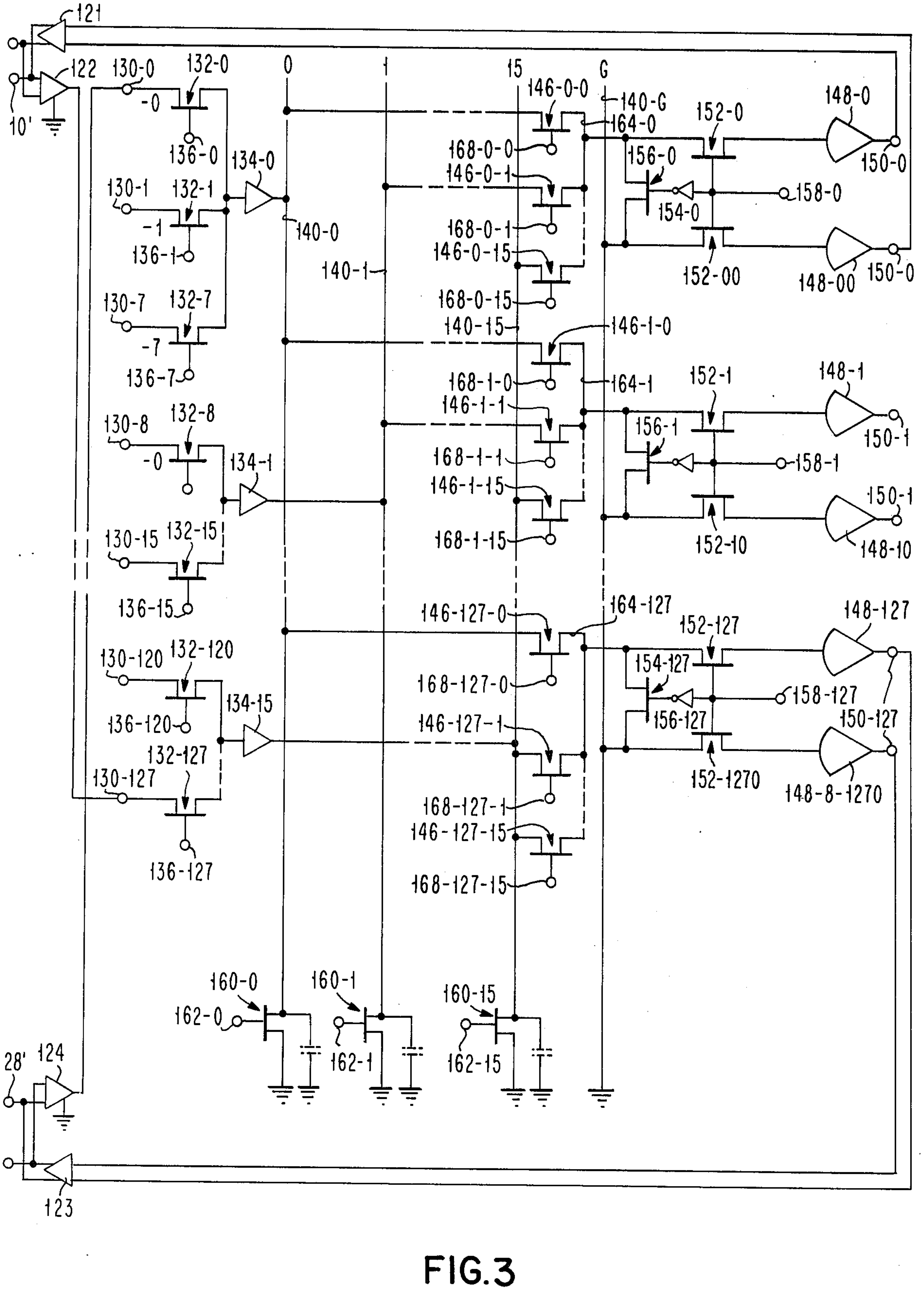
FIG. 3 is a schematic diagram of an electric circuit switching facility according to the invention.

In the diagram of FIG. 3, connections are shown for voice telephone signal switching only in the interest of clarity. The arrangement is shown for a two-way voice communications between communication line terminals 10' and 28'. The amplifying circuits 121, 122, 123, and 124 are connected as two-to-four wire converting circuits demonstrating that the electric circuit switching facility is essentially a four-wire network with one wire being at fixed reference potential, shown here as ground. This arrangement is an example of a 128 port switch matrix which can be contracted or expanded as will be seen. This circuitry is readily embodied into conventional semiconductor structure; for example, 8 input switch chips, each of which provides 16 FET analog switches are connected in to groups of 8 switches each with output nodes connected in common. The matrix input terminals 130-0, 130-1, . . . 130-127 are connected selectively by 130-0, 132-1, . . . 132-127 to 16 node driver circuits 134-0, 134-1, . . . 134-15. Analog samples of the input signals are multiplexed onto 16 node busses 140-0, 140-1, . . . 140-15. The reason for having 16 node busses instead of but one is to be able to increase the total bandwidth of the matrix switching facility as mentioned hereinbefore and/or will be explained hereinafter in greater detail. The circuit also comprises 16 output switch chips, each of which has 8 sets of 16 node bus select FET analog switches feeding double rail FET sample-and-hold circuits. With the above mentioned 8 input chips plus 16 output chips the 128 port switch matrix switching facility requires a total of only 24 switch chips. Signals on the 16 node busses 140-0, 140-1, . . . 140-15 are transferred by FET switches 146-0-0, 146-0-1, . . . 146-127-15 to 128 sample-and-hold circuits 148-0 and 148-00, 148-1, and 148-10, . . . 148-127, and 148-1270 leading to output dual terminals 150-0, 150-1, . . . 150-127. One purpose of dual sample-and-hold circuits is to provide common mode noise rejection for nullifying power supply and sampling gate noise.

The output FET 146-0-0, 146-0-1, . . . 146-127-15 connects the signal node but to leads 164-0, 164-1, . . . 164-127 at sampling time. Sample switches, comprising FET 152-0 and 152-00, 152-1 and 152-10, . . . 152-127 and 152-1270 serve to isolate the leads 164-0, 164-1, . . . 164-127 and the sample-and-hold circuits 148-0 and 148-00, . . . 148-127 and 148-1270 when no sampling is taking place. Also shown are shielding switch elements, comprising FET 154-0, 154-1, . . . 154-127, which short circuit leads 164-0, 164-1, . . . 164-127 to the ground bus 140-G. These shielding switch elements are closed except when a corresponding output switch element 146-X-X and sample switch element pair 152-X are closed, that is, the short circuit is removed only during output sampling. Inverting circuits 156-0, 156-1, . . . 156-127, for example, are connected to the corresponding sample pair switch element control voltage terminals 158-0, 158-1, . . . 158-127 as one arrangement for obtaining reciprocal switching action. Node bus capacitor discharging switch elements 160-0, 160-1, . . . 160-15 and corresponding control voltage terminals 162-0, 162-1, . . . 162-15 complete the circuitry. At all times other than during sampling times the open circuit impedance of the output and sampling switch elements plus the closed circuit impedance of the shielding switch elements serves to reduce crosstalk and noise from the active node busses. A two-way conversation requires two separate paths through the switch matrix. The two-to-four wire terminating sets for the two conversing subscribers provide two inputs to the switch matrix as well as two receiving differential amplifiers to accommodate the two switching paths involved.

Figure 4:
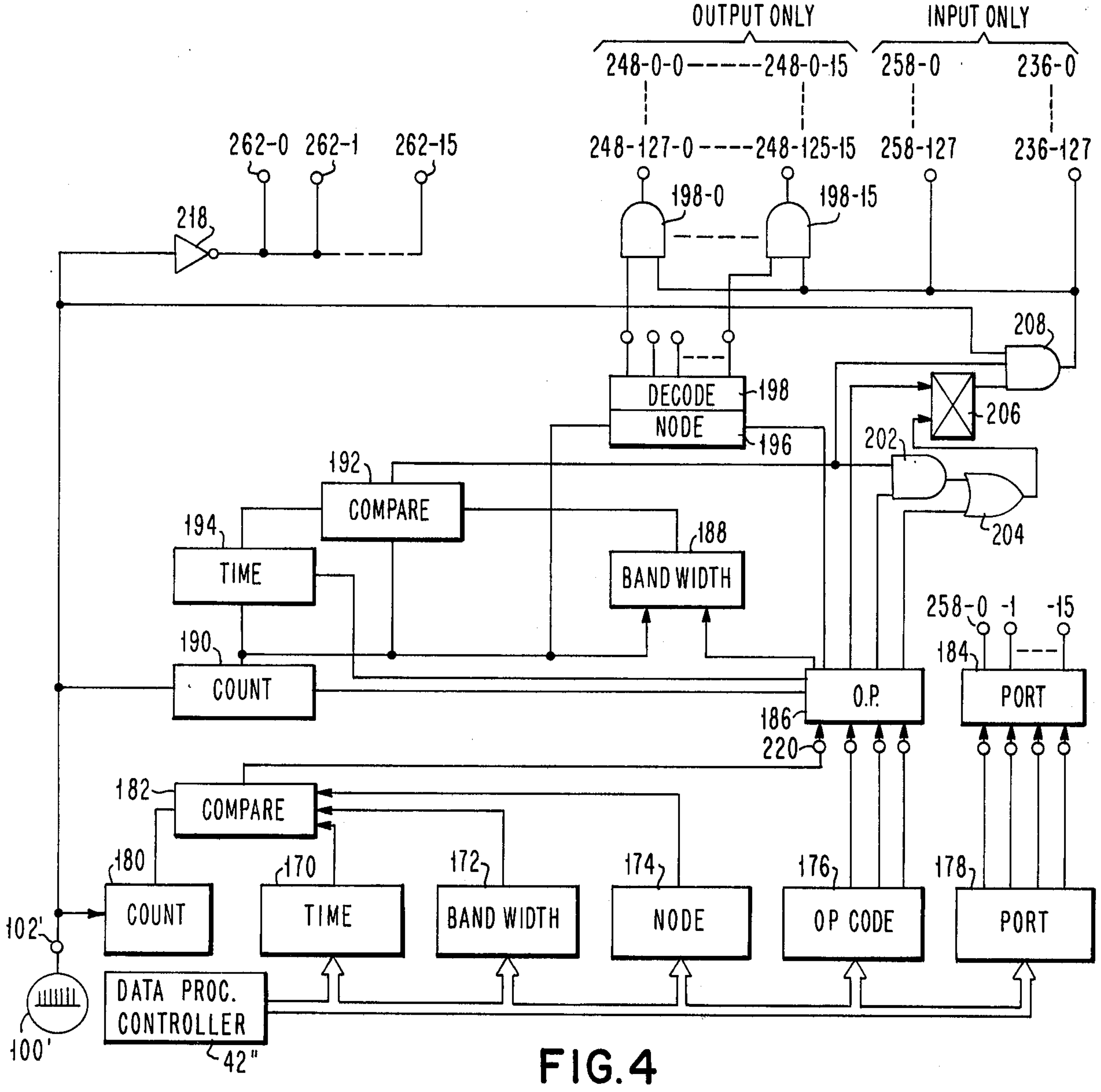
FIG. 4 is a functional diagram of control logical circuitry for operating the electric circuit switching facility according to the invention.

FIG. 4 is a functional diagram of one example of control logical circuitry constructed and tested with the switching matrix of FIG. 3 as embodied in semiconductor chips as will be described hereinafter. The system was arranged for both voice and digital data communication. Conventional telephone sets of either the rotary dial or the touch-tone variety are accommodated over conventional twisted-pair of other commercially available communications circuit transmission lines. Digital data terminal sets are similarly accommodated.

The circuitry is preferably divided into a number of semiconductor device "chips" for the switch matrix facility shown in FIG. 3 and described above, including control logical circuitry for each particular chip plus at least one additional interfacing common control logical circuitry chip as shown in FIG. 4. In the disclosure to follow but one of each component is shown and described in the interest of clarity. Those skilled in the art readily will assemble the number needed for the particular application at hand.

As described above, FET analog gates and time division multiplexing circuits apply samples of each of multiple input signals onto a common bus and thereafter distribute these samples again as corresponding multiple output signals. Each sample is a pulse amplitude modulated representation of the corresponding input level. Since an infinite choice of amplitude is available there is no quantization noise.

A basic sampling rate of 32 KHz is satisfactory for reconstruction of high quality voice by means of sample-and-hold circuits on the switch output side with no input filtering and minimum output filtering and with high bandwidth digital rates through the same switching circuit path. This high sampling rate is feasible with parallel switch elements augmenting the raw performance available from present day FET switch technology. Still higher digital bandwidth can be dynamically assigned to any channel on a demand basis by the control computer. The software, in effect, assigns additional time slots to those connections requesting higher than basic bandwidth.

For digital transmission an ideal switch element presents a d.c. connection between the input and output terminals and the switch element itself is "transparent" except for the usual upper limit on bit rate. Pulse amplitude is made to convey phase as well as transition information through the TDM switch facility so that an input digital waveform can be reproduced at the output. The output is necessarily delayed by a fixed amount of one sample-to-sample period but the switch element is otherwise transparent. Further information is available in the above-mentioned copending U.S. Pat. application Ser. No. 475,683.

A control computer 42'' is used to connect and disconnect the circuits and to perform all special features expected of a modern electronic communications exchange. Interface logic is incorporated for passing line numbers and control signals back and forth and to keep track of time slot identification. Line isolation circuitry is arranged to protect the electronic equipment from high voltage line signals and transients. The system is arranged for the interconnection of "hookswitch," "dial" and "keypulse" monitoring equipment.

The common chip comprises a time slot register 170, a bandwidth register 172, a node bus register 174, and operation code register 176 and a port address register 178, all coupled to the data processing controller 42''. Also, a 7-bit counter 180 and a comparing circuit 182 is arranged on this common chip. The 7-bit counter 180 which is maintained either in synchronism or possibly slightly ahead of the counters on the matrix chips provides an identification of the current time slot. The operation code register 176 and the port address register 178 provide means for the control computer 42'' to transmit the corresponding operation and port address to the switch matrix chips. The other common chip registers 178, 172, and 174 are selectively connected to the comparator 182 so that when the contents of the register equal the current count a "chip select" signal line 220 is sent to one of the switch matrix chips which will cause the count value from the matrix chip counter 190 to be loaded into the appropriate port register 194, 188 or 196 respectively. The control computer 42'' is arranged to specify which of the several switch matrix chips is to receive the "chip select" signal line 220. Each switch matrix chip in addition to the switching facility circuitry comprises a port address decoding circuit 184, an operation code decoding circuit 186, a 7-bit counting circuit 190 and for each port on the switch matrix chip a bandwidth register 188, a comparing circuit 192, a time slot register 194, and, for output switch chips only, a node bus register 196 having a decoding circuit 198 and a decode gating circuits 198-0, 198-1, etc. Switch controlling sub-circuitry is also arranged on each matrix chip comprising an AND gating circuit 202, an OR gating circuit 204, an electronic latching circuit 206 and another AND gating circuit 208 for each port connected together for raising a "connect" voltage level. For input chips only, an inverter 218 provides node capacitor discharging electric pulses between every consecutive pair of timing pulses to the switch matrix. The terminals 236-0 through 236-127 of the AND gating circuits are connected to the terminals 136-0 through 136-127 respectively of the input switching FET 132-0 through 132-127. The terminals 262-0 through 262-15 are connected to the terminals 162-0 through 162-15 respectively of the capacitor discharging FET 160-0 through 160-15 in an exemplary illustration of the discharging of the node bus capacitor prior to the storing of the input signal samples. In actual practice the discharge time will be about the first 1/10 of the sample time slot. The node bus decode circuit terminals 248-0-0 . . . 248-127-15 are connected to the terminals 168-0-0 . . . 168-127-15 of the node bus connecting FET 146-0-0 . . . 146-127-15 and the terminals 258-0 . . . 258-127 are connected to the terminals 158-0 . . . 158-127 of the sampling FET switch pairs. It should be borne in mind that other decoding arrangements may be used by those skilled in the art.

The reason for having a 7-bit counter 190 on each chip is to reduce the number of circuit connecting I/O pads required on each chip. The output of the counter 190 is the time slot identity digit I.D. If more circuit connecting I/O pads were physically possible on each chip these 7 bits of data could be distributed to the chips from a single external source as from the counter 180. Means for resetting all of the counters are provided so that the counters on all chips in the system can be synchronized. Three data lines from the operating code register 176 to the decoding circuit 186 provide means for setting controls for the various ports. Potential at the "chip select" line terminal 220 enables the operation decoding circuit 186 on the selected chip(s). Four address lines from the port address register 178 identify the port on the selected chip(s) for which the operation is to be effective. The 7-bit counter 190, operation decoder 186 and port address decoder 184 are common to all the ports on the same matrix chip. Logical circuitry individual to the ports is arranged to perform the following functions. A 7-bit time slot register 194 holds the time slot assignment until a reassignment is made. This register 194 is loaded by controls which set the port address decode circuit 184 equal to the address of the desired port, the operation decoding circuit 186 equal to the "assign-time-slot" code and set the chip select line 220 "ON" during any one clock period when the 7-bit counter 190 has a count equal to the time slot identity count which is to be assigned. The 7-bit compare circuit 192 continuously compares the value stored in the time slot register 194 with the value in the 7-bit counter 190. A 3-bit bandwidth register 188 holds the bandwidth assignment until a reassignment is made. This register is loaded by arranging controls to set the port address equal to the address of the desired port, set operation code equal to the "set-bandwidth" code point and set the chip select line "ON" during any one clock period when the low order 3 bits of the 7-bit counter 190 are equal to the desired bandwidth code. A bandwidth code of zero enables a full 7-bit compare so that the contents of the time slot register and the counter contents are equal only once for every full revolution of 128 time slots, thus providing an 8KHz sampling rate assuming a 1 Megahertz clock 102'. A bandwidth code of 1 enables only the 6 low order bits of the comparator 192 so that the pertinent counts are equal twice per revolution of the counter or once every 64 time slots, thus providing a 16 KHz sampling rate. The other 6 possible bandwidth codes progressively enable fewer and fewer bits of the comparator 192 to provide bandwidth options of 32, 64, 128, 256, 512 or 1024 KHz. The 4-bit node bus register 196 holds the node bus assignment until a reassignment is made. This register is provided only an output switch matrix chips since the input switch matrix chips do not perform a node bus selection function but are premanently wired to a specific pre-assigned node bus. This register is loaded by arranging controls which set the port address equal to the address of the desired port, set the operation code equal to the "set-node" code point and set the chip select line "ON" during any one clock period when the low order 4 bits of the 7 bit counter 190 are equal to the desired node code. Node bus register 196 feeds a 16-way decoder 198 which makes a static selection of the node bus switch 146-X-X to be used. This static selection is gated by a comparison of the time slot and count together with latch circuit 206 "ON" and fine clock timing so that the node bus selection switch element 148-X-X is closed only during assigned time slots. The 1 bit "connect" latch 206 enables the switch elements as long as the connection is to be maintained. This electronic latch 206 is set ("ON") by arranging controls to set the port address equal to the address of the desired port, set the operation code equal to the "connect" code point and set the "chip select" line "ON" during any clock period. This is an immediate operation in that the value of the counter 190 is not material. The latch 206 is reset ("OFF") when the operation code is equal to the "disconnect" code and the other two lines are as above during any clock period. On input chips only, the "connect" latch 206 is reset alternately by arranging controls to set the operation code equal to the "clear" code and set the "chip select" line "ON" during a clock period when the count in the 7-bit counter 190 is equal to the time slot identity count which is to be cleared. All electronic latches 206 on the selected chip(s) are reset on receipt of a signal during indicated time slot if the compare circuit 192 has an output indicating count equality. This provides means for a blanket reset of all input switches assigned to a particular node and time slot. This function must be used with care to avoid undesired results. If, for example, the two output node busses from a single chip are not wired together but are instead used to drive two separate node busses then a "CLEAR" instruction to this chip will disconnect ports (that are using the current time slot) from both node busses. This results from the fact that chip select is common to all ports on the chip. The "CLEAR" function is not applicable to the output matrix chips because any port can be assigned to distribute from any of the 16 node busses and the controls have no way of telling the ports which node bus is to be cleared. The counter "reset" function is executed when the controls are arranged to set the operation code equal to the "reset" code point and set the "chip select" line "ON" during any clock period. The counter immediately goes to its zero value just as though it had advanced from all ones to all zeros at the beginning of the current time slot. This function is necessary to get the counters into synchronism as electric power first comes on and to re-establish or guarantee synchronism at any time during normal operation.

Returning to the topic of assigning time slots, it should be noted that the average latency for assigning a 7-bit time slot identity is 64 time slots. This latency is necessary only for setting up 8KHz connections. For higher bandwidth assignments the high order bits of the time slot register are ignored. Consequently it does not matter which bit combination is stored in them and the time slot register may be loaded whenever the significant bits of the 7-bit counter reach the desired value. This can significantly reduce time slot assignment latency for high bandwidth connections.

The table below shows the various ways that the total switch bandwidth of 16MHz can be allocated for various sampling rates. For example a system with 32 KHz assigned for each user has 32 channels available per node bus. If the desired grade of service allows one fourth of the subscribes to talk simultaneously, then 128 ports per node bus, corresponding to a 2048 line exchange can be accommodated. As a second example, the top line of all columns in Table I shows the possibility of having 2048 terminal subscribers, all communicating at the same time (non-blocking exchange) using the 8KHz sampling rate for all channels.

TABLE I

| BW Code | Sample Rate KHz | Channels/ Node bus | Total Channels | Specific Service |
|---|---|---|---|---|
| 0 | 8 | 128 | 2048 | Modem |
| 1 | 16 | 64 | 1024 | |
| 2 | 32 | 32 | 512 | Voice |
| 3 | 64 | 16 | 256 | |
| 4 | 128 | 8 | 128 | |
| 5 | 256 | 4 | 64 | |
| 6 | 512 | 2 | 32 | |
| 7 | 1024 | 1 | 16 | |

The parallel node concept provides design flexibility. For example, with a given switch capability as shown in the table below, the other design choices are available with the largest possible number of nodes approaching space division in performance and cost.

TABLE II

| | | | | |
|---|---|---|---|---|
| 1 | Node | 8 | KHz Basic BW | 1 MHz Total BW |
| 2 | Nodes | 16 | do. | 2 |
| 4 | do. | 32 | do. | 4 |
| 8 | do. | 64 | do. | 8 |
| 16 | do. | 128 | do. | 16 |
| 32 | do. | 256 | do. | 32 |

With 32 KHz sampling rate, little or no filtering is required for high quality voice transmission. The available digital bandwidth is advantageous for terminal applications.

Figure 5:
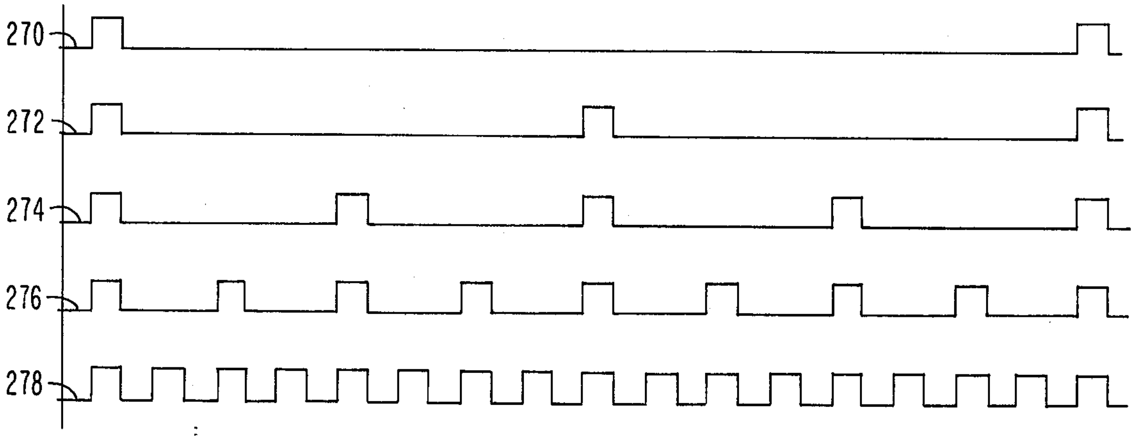
FIG. 5 is a graphical representation of waveforms useful in understanding of a variable bandwidth communications system using the switching facility according to the invention.

FIG. 5 depicts the harmonic relationship of timing wave pulses selected for sampling at various bandwidths. The base rate is represented by a curve 270. The next wider band is obtained by the second harmonic rate represented by a curve 272. Curves 274, 276 and 278 progress upwardly in bandwidth representation by a factor of 2 in each instance. If the curve 270 represents an 8KHz modem band, the curve 274 then represents a 32 KHz voice band, and so on.

Signal feedthrough from non-selected input terminals onto a common node bus it not a great problem because of the very high impedance of FET gating devices in the open or off condition and because of the low node bus impedance with its large capacitance to ground and its associated low impedance input driver.

Node bus residue crosstalk is a possible source of cross-talk from any time slot to the next due to the residual charge on a node bus capacitor. This effect is basically small because it is desirable to fully charge the node capacitance during each time slot in order to avoid insertion loss. However, if needed, the discharge switch 160-X can be actuated by the inverse of switching pulse applied to the terminals 136-0 . . . 136-127, to fully discharge all node bus capacitors in a short time interval at the beginning of every time slot. If, for example, the closed switch resistance of the discharge switch is ⅛ that of an input switch, the time constant for the discharge path will be ⅛ that of the charge path so that only 1/9 of the time period is needed for discharge. If the discharge period is 10 RC (where R is the closed discharge switch resistance and C is the node capacitance), the ratio of residual to signal voltage will be 86 db.

Insertion loss due to converting the input signal into a pulse amplitude signal on a common node bus also can be avoided by fully charging the node capacitor. A 10 RC charge period along with the zero offset voltage of the FET switch hold this loss to 0.0004 db. Tight gain tolerances for the port amplifiers 121, 122, 123, and 124 are also desired.

Input switch gate noise results from gate signal transients coupled into the node busses by way of switch gate capacitance elements. This is no problem if the output strobe is taken after the switch closing transient dies out and before the switch opening transient starts.

Signal feedthrough from the nodes to unselected outputs is not a large problem because of the high impedance looking into the open output switch(s) and because the sampling switch activated in coordination with the output switch is provided to prevent such feedthrough. At all other times, it is open so that the path from node bus to output amplifier is through two open FET switches with the intermediate link grounded. During the time that an output switch is closed, the low impedance of the common node bus with the associated driver will absorb signal feedthrough from the other fifteen output switches for the same port.

While the invention has been shown and described particularly with reference to a preferred embodiment thereof and alternatives have been described, it should be understood that those skilled in the art will make further changes without departing from the spirit and the scope of the invention as defined in the appended claims.

The invention claimed is:

1. An electric signal exchange switching circuit arrangement, comprising, a multiple of input signal terminals, a multiple of output signal terminals, a number of node busses, a number of electron flow path devices each having two circuit path electrodes and a control electrode with one circuit path electrode of each of said devices connected individually to one of said input signal terminals and the other of said circuit path electrodes of each of said devices connected to one of said node busses.

another number of said electron flow path devices having one circuit path electrode of each individually connected to one of said node busses and the other circuit path electrode connected to one of said output signal terminals, a timing pulse train generating circuit, control circuitry having an input terminal connected to said timing pulse train generating circuitry and having output terminals coupled to said control electrodes of the first said number of electron flow path devices for successively applying signals appearing at said input signal terminals to said node busses at a predetermined rate and coupled to said control electrodes of said other number of electron flow path devices for sampling said node busses for said applied signals at a rate corresponding to said predetermined rate at which at least all of the applied signals are translated individually to said output signal terminals, and a further number of said electron flow path devices having one circuit path electrode of each individually connected to one of said node busses, the other circuit path electrodes connected in common to a point of fixed reference potential and control electrodes connected to said control circuitry, for successively closing the circuit paths of said further number of electron flow path devices at a rate related to said predetermined rate.

2. An electric signal exchange switching circuit arrangement as defined in claim 1 and incorporating an additional number of said electron flow path devices individually interposed between said output signal terminals and said other number of electron flow path devices with the circuit paths of the devices connected between the electrodes of said other devices and the output signal terminals, thereby providing the capability of isolating said output terminals when the latter one is idle.

3. An electric signal exchange switching circuit arrangement as defined in claim 2 and incorporating complementary output signal terminals individual to said output signal terminals, and complementary electron flow path devices individually connected between said complementary output terminals and said point of reference potential.

4. An electric signal exchange switching arrangement as defined in claim 1 and incorporating an additional number of said electron flow path devices individually interposed in pairs between said output signal terminals and said other number of electron flow path devices with the circuit path of one device of each pair connected between the other circuit path electrodes of said other devices and said output signal terminals and the other device of each pair connected between the complementary output signal terminal and said point of reference potential, thereby providing the capability of isolating said output signal terminals when the latter are idle.

5. An electric signal exchange switching arrangement as defined in claim 4 and incorporating a supplemental number of said electron flow path devices having electron flow path electrodes connected individually to like electron flow path electrodes of said additional number of electron flow path devices, thereby providing the capability of a substantially short circuit between said additional electron flow path devices when the latter are idle.

6. An electric signal exchange switching circuit arrangement as defined in claim 1 and wherein said control circuitry is arranged for changing said predetermined rate of periodic sampling, thereby to modify the bandwidth of signal passed by the switching circuit arrangement.

7. An electric signal exchange switching circuit arrangement as defined in claim 6 and wherein said control circuit is arranged for increasing the rate of periodic sampling over a base rate.

8. An electric signal exchange switching circuit arrangement as defined in claim 6 and wherein an increased rate is harmonically related to said predetermined rate and said control circuit is arranged for adjusting said relationship, thereby to adjust the bandwidth of signal translated through the switching circuit arrangement.

9. The invention as described in claim 1 and incorporating a number of sample-and-hold circuits individually connected to the circuit path electrodes of said other number of electron flow path devices, thereby to hold samples at said output signal terminals.

10. The invention as described in claim 9 and wherein said sample-and-hold circuits comprise semiconductor structure including capacitor storage circuitry.

11. An electric signal exchange switching circuit arrangement, comprising solid state electron circuitry arranged on a substrate, including a multiple of input signal terminals, a multiple of output signal terminals, a number of node busses each forming a capacitor in conjunction with said substrate, a number of electron flow path devices each having two circuit path electrodes and a control electrode with one circuit path electrode of each of said devices individually connected to one of said input signal terminals and the other of said circuit path electrodes of each of said devices connected to one of said node busses, another number of said electron flow path devices having one circuit path electrode of each individually connected to one of said node busses and the other circuit path electrode coupled to one of said output signal terminals, electronic circuitry connected to said node busses for obviating the effect of said capacitors on the operation of the overall switching circuit arrangement, a timing pulse train generating circuit, and control circuitry having output terminals connected to said control electrodes of the first said number of electron flow path devices for successively applying signals appearing at said input signal terminals individually to one of said node busses at a predetermined rate and other output terminals connected to said control electrodes of said other number of electron flow path devices for sampling said node busses for said applied signals at a rate corresponding to said predetermined rate at which at least all of the applied signals are translated individually to said output signal terminals.

12. An electric signal exchange switching circuit arrangement as defined in claim 11 and wherein said circuit arrangement comprises integrated semiconductor devices.

13. An electric signal exchange switching circuit arrangement as defined in claim 12 and wherein said electronic circuitry comprises a further number of electron flow path devices each having a circuit path electrode connected to an individual one of said node busses, another circuit path electrode connected to a point of reference potential in common with the other circuit path electrodes of said further number of devices, and a control electrode connected to said control circuitry for periodically discharging said capacitors formed between said node busses and said point of reference potential.

14. An electric signal switching exchange circuit arrangement as defined in claim 13 and wherein said electron flow path devices are field effect transistors each having source and drain electrodes constituting the circuit path electrodes and a gate electrode constituting the control electrode.

15. An electric signal switching exchange circuit arrangement as defined in claim 13 and wherein said substrate is connected to said point of reference potential.

* * * * *